March 14, 1933. G. N. HARCOURT 1,901,238
PROCESS OF RECOVERING DRIP OIL FROM CERTAIN RESIDUUMS
Filed April 2, 1930
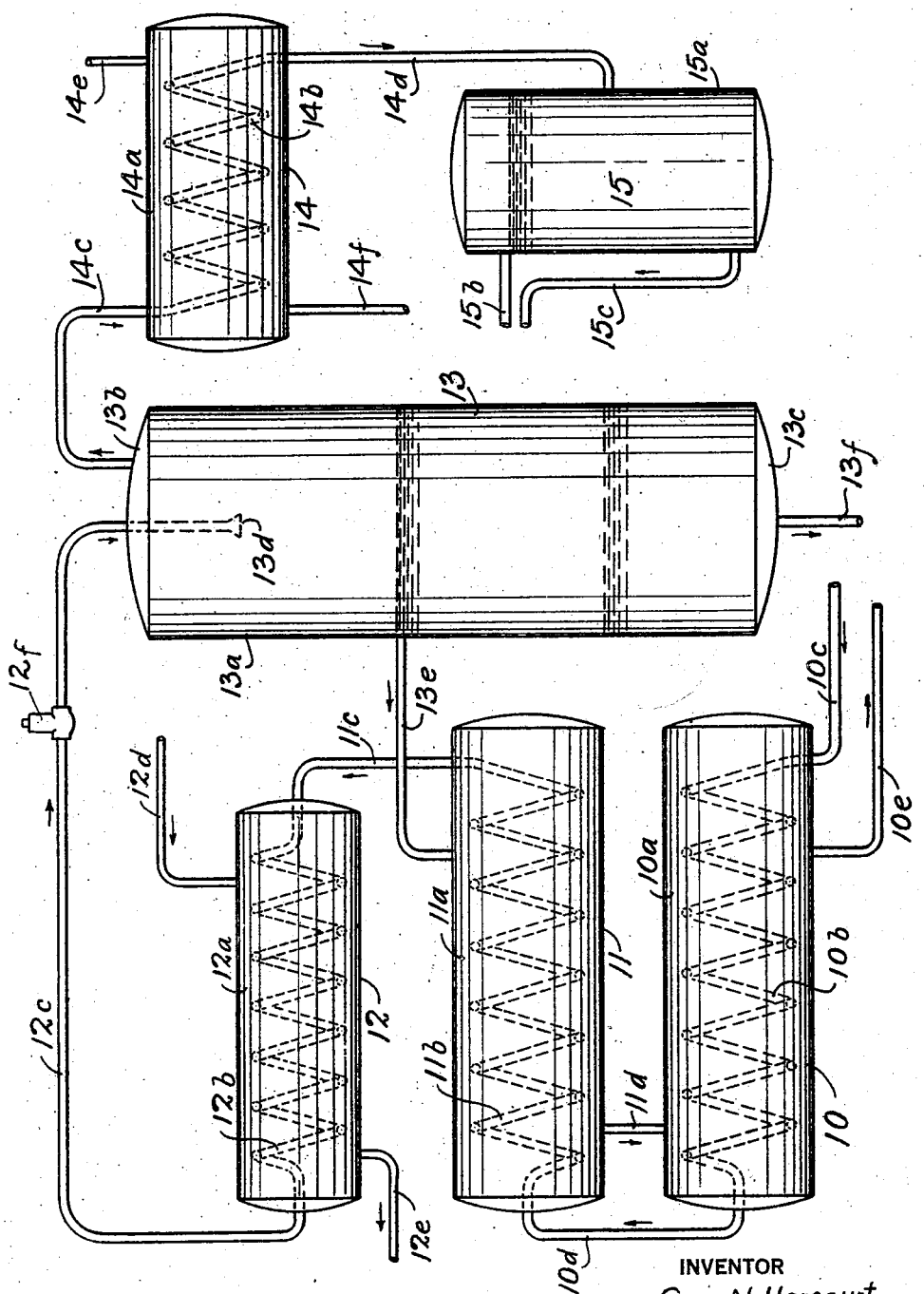
INVENTOR
Guy N. Harcourt
BY S. O. Yeaton
ATTORNEY

UNITED STATES PATENT OFFICE

GUY N. HARCOURT, OF LARCHMONT, NEW YORK, ASSIGNOR, BY MESNE ASSIGNMENTS, TO ALCO PRODUCTS INCORPORATED, OF NEW YORK, N. Y., A CORPORATION OF DELAWARE

PROCESS OF RECOVERING DRIP OIL FROM CERTAIN RESIDUUMS

Application filed April 2, 1930. Serial No. 440,937.

This invention relates to an improved process for recovering drip oil from residuums containing water, tar, and drip oil constituents, such as are produced in the manufacture of water gas, and to an apparatus for practicing the same.

The process of manufacturing water gas comprises producing an initial gas by blowing steam through a bed of hot coal or coke. This initial gas has a thermal efficiency of from 300 to 400 B. t. u's per cubic foot. The laws in most communities have provisions requiring that the gas delivered to consumers be capable of yielding not less than 500 B. t. u's per cubic foot. To meet such requirements it is the practice to pass the initial gas through a heating chamber in which is sprayed gas oil. The temperature of the chamber is sufficiently high to crack the gas oil, producing a gas therefrom having high thermal properties, which gas mixes with the gas initially produced forming a resultant gas capable of yielding 500 B. t. u's or more per cubic foot. To cool the resultant gas and to remove the tar and drip oil constituents therefrom, it is passed through scrubbers, which may be in the form of towers filled with comminuted coke, through which trickle streams of water. The gas is thus brought into intimate contact with the water, which cools the gas and withdraws the tar and drip oil constituents therefrom.

For reasons which are not well understood, the residuums containing water, tar, and drip oil constituents, produced in the process, vary considerably in their properties, due probably to slight variations in the quality of gas oil used, the intensity of the heat employed, and the duration of the heating period. At times the residuum produced is such that its water content will readily separate from the tar, and drip oil constituents, by gravity. At other times, although produced under apparently identical conditions, the residuum takes the form of an emulsion having substantially no commercial value. The gas companies are prohibited from throwing such emulsions into sewers and streams on account of the resulting pollution. Until recently the only means of disposing of emulsified residuums was to allow them to settle in tanks for from four to six months. This treatment sometimes resulted in breaking down the emulsion, with consequent gravity separation of the water content from the remainder of the emulsion, and at other times, it did not. Recently there has been developed a process for treating the residuums which comprises heating them to a temperature of approximately 250° F., and then spraying the heated liquid into a chamber. This treatment, because of the explosive action of the water globules as they flash into steam when the heated emulsion passes into spray, destroys any equilibrium that might cause an emulsion to persist. A large percentage of the residuum sprayed settles in the chamber in the form of a mixture of water and tar, from which the water readily separates, and a large percentage of the drip oil constituents pass off in the form of vapor mingled with the steam and is discharged to the atmosphere. This loss of the drip oil constituents constitutes a serious waste, as drip oil has a definite market at a price several times that of tar.

An object of the present invention is to provide an improved process for treating water gas residuums, whereby emulsions are destroyed and a substantial recovery of drip oil is effected.

Another object of the invention is to provide an economical apparatus for practicing the improved process.

Other objects of the invention will hereinafter readily appear.

The improvement claimed is hereinafter fully set forth.

The single view of the accompanying drawing is a side elevation of an apparatus for carrying out the invention.

The apparatus exemplified in the accompanying drawing comprises three heaters 10, 11 and 12, for raising the temperature of the liquid residuum obtained in the manufacture of water gas, to a degree sufficient to break down emulsions, when the residuum is sprayed; a vaporizer 13 in which the residuum is sprayed; a condenser 14, for condensing the steam and vaporized drip oil constituents formed in the spraying step; and a gravity separator 15 for separating the liquid formed in the condenser into water and drip oil. Each heater comprises a cylindrical shell and a heating coil, the shells of the respective heaters being numbered 10a, 11a, and 12a, and the coils thereof being numbered 10b, 11b and 12b. The liquid residuum from any suitable source of supply is forced by a pump, not shown, through the pipe 10c, into one end of the coil 10b, from the other end of that coil through a pipe 10d into one end of the coil 11b, from the other end of that coil through the pipe 11c in one end of the coil 12b, and from the other end of that coil through a pipe 12c into the vaporizer 13.

The vaporizer is in the form of a vertical cylindrical shell having a side wall 13a, a top wall 13b, and a bottom wall 13c. The pipe 12c for admitting heated residuum to the vaporizer extends through and depends below, the top wall 13b of the vaporizer and terminates in a spraying nozzle 13d which may be relied upon to produce what pressure may be desired in the heated liquid or a valve 12f may be placed in the pipe 12c.

When the residuum is sprayed a quantity of it collects in the vaporizer as a liquid, and gravity acts to cause the water content to rise to the top and the tar content to sink to the bottom. The water contains considerable heat, and as it is drawn off from the vaporizer is utilized to supply the heat to the preliminary heaters 10 and 11. To this end the vaporizer is placed in communication with the heater 11 by a pipe 13e, the heater 11, is placed in communication with the heater 10 by a pipe 11d and the heater 10 is provided with a discharge pipe 10e.

The heater 12 is heated by steam which may be led from any suitable source through a pipe 12d into the casing 12 and discharged from said casing through a pipe 12e.

The condenser 14 comprises a cylindrical shell 14a and a cooling coil 14b. The vapors formed in the vaporizer are led from the top of the vaporizer into one end of the coil through a pipe 14c, and condensates formed in the coil are discharged from the other end thereof through a pipe 14d into the gravity separator 15. The liquid for cooling the condenser is supplied thereto by a pipe 14e and is discharged therefrom through a pipe 14f.

The gravity separator 15 comprises a vertical cylindrical shell 15a, a pipe 15b leading from the upper end of the shell for taking off drip oil, and a pipe 15c leading from the lower end of the shell for drawing off water.

In practicing the process, the liquid residuum containing water, tar, and drip oil constituents is first pumped through the coils 10b, 11b and 12b of the respective heaters, for the purpose of raising its temperature to a sufficient degree to insure breaking down emulsions when the residuum is sprayed. Pressure may be employed in addition to heat if required. A temperature of approximately 250° F. has been found satisfactory to insure the breaking down of emulsions when the residuum is sprayed. The heated residuum is then sprayed through the nozzle 13d in the vaporizer. A large percentage of the sprayed residuum falls in liquid form in the vaporizer, and as the tar is heavier than water it settles to the bottom of the vaporizer from which it is withdrawn through the pipe 13f. The water rises above the tar and is withdrawn from the vaporizer through the pipe 13e and is utilized as hereinbefore stated to supply heat to the heaters 10 and 11 for preliminarily heating the residuum. As the residuum is sprayed some of the water globules explode forming steam, and a large percentage of the drip oil constituents pass into vapor which mixes with the steam. The mixture of steam and vaporized drip oil constituents is led from the vaporizer through a pipe 14c, into the cooling coil 14b of the condenser 14, where the steam is condensed to water and the vaporized drip oil constituents are condensed to drip oil. The liquid mixture of drip oil and water thus formed is led from the condenser to the gravity separator 15 through the pipe 14d. The drip oil being lighter than the water rises to the top of the separator and is withdrawn therefrom through the pipe 15b. The water is withdrawn from the bottom of the separator through the pipe 15c, which is provided with the vertical branch as shown to insure a sufficient volume in the separator.

While heating the residuum to approximately 250° F., has been found suitable to effect breaking down of emulsions, it is to be understood that the invention is not limited to such temperature, but contemplates using any temperature adapted to effect vaporization of the drip oil constituents when the residuum is sprayed.

The process possesses the important advantage that it is not a batch treatment but a continuous stream treatment, the residuum moving in a continuous flow through the heaters into the vaporizer, the water and tar which settle in the vaporizer being separately continuously withdrawn from the vaporizer, the steam and vaporized drip oil constituents being continuously withdrawn from the vaporizer and fed through the condenser, the liquid mixture of water and drip oil formed in the condenser being continuously withdrawn therefrom and conveyed to the separator, and the water and drip oil separated from one another by gravity in the separator being individually continuously withdrawn therefrom.

So far as I am aware it is broadly novel to recover drip oil as above set forth.

The invention effects a substantial economy in the treatment of residuums formed in the manufacture of water gas to break down emulsions, in that, a substantial quantity of drip oil which went to waste with the discharge vapors in the processes heretofore practiced, is recovered for commercial sale.

While one of the preferred processes and one of the preferred forms of apparatus have been disclosed, it is obvious that many variations in the process may be practiced, and that the form, arrangement and construction of the parts of the apparatus may be varied, and the invention therefore is not limited to the particular embodiments disclosed, but includes such changes and modifications as come within the spirit and scope of the invention as set forth in the appended claim.

The invention claimed and desired to be secured by Letters Patent, is:

A process of recovering drip oil from water gas tar comprising heating the tar above the boiling point of water in a plurality of heating stages, the first of which comprises a heat exchange step with water previously separated from the process and the second of which comprises a heating step with heat supplied from an independent source, spraying the oil under sub-atmospheric pressure into a vaporizing and separating zone, continuously withdrawing unvaporized water and tar from separate points within said zone, utilizing the heat from said water to preheat the tar in said first heat exchange step, continuously withdrawing vapors from said zone, condensing said vapors and separating the drip oil from the aqueous portion of the condensate.

GUY N. HARCOURT.